United States Patent
Chen et al.

(10) Patent No.: US 12,265,518 B2
(45) Date of Patent: Apr. 1, 2025

(54) DATA HANDLING METHOD, SYSTEM AND COMPUTER PROGRAM

(71) Applicant: 17LIVE Japan Inc., Tokyo (JP)

(72) Inventors: Yan-Tsuen Chen, Taipei (TW);
Tsung-Tai Shih, Taipei (TW)

(73) Assignee: 17LIVE Japan Inc., Tokyo (JP)

( * ) Notice: Subject to any disclaimer, the term of this patent is extended or adjusted under 35 U.S.C. 154(b) by 196 days.

(21) Appl. No.: 17/985,591

(22) Filed: Nov. 11, 2022

(65) Prior Publication Data

US 2024/0004859 A1    Jan. 4, 2024

(30) Foreign Application Priority Data

Jun. 29, 2022  (JP) ................................. 2022-104864

(51) Int. Cl.
*G06F 16/23* (2019.01)
*H04L 67/55* (2022.01)

(52) U.S. Cl.
CPC .............. *G06F 16/23* (2019.01); *H04L 67/55* (2022.05)

(58) Field of Classification Search
CPC ..... H04L 67/55; G06F 16/23; G06Q 30/0208; G06Q 30/0242; G06Q 30/0279; G06Q 30/0282; G06Q 50/01
See application file for complete search history.

(56) References Cited

U.S. PATENT DOCUMENTS

| | | | |
|---|---|---|---|
| 2016/0082348 A1* | 3/2016 | Kehoe | G06Q 10/101 463/31 |
| 2018/0280812 A1* | 10/2018 | Vaccari | A63F 13/48 |
| 2020/0007934 A1* | 1/2020 | Ortiz | H04N 21/25883 |
| 2020/0065853 A1* | 2/2020 | Cvinar | G06Q 30/0276 |

FOREIGN PATENT DOCUMENTS

CN    110401843 B   *  2/2022   ......... G06F 16/2358

OTHER PUBLICATIONS

Notification of Reasons for Refusal dated Jan. 10, 2023, issued in corresponding Japanese Patent Application No. 2022-104864 with English translation (4 pgs.).

* cited by examiner

*Primary Examiner* — Benjamin M Thieu
(74) *Attorney, Agent, or Firm* — Chun-Ming Shih; HDLS IPR SERVICES

(57) ABSTRACT

The subject application relates to a data handling method for updating lists based on real-time requests and includes: transmitting a first request to a first queue component according to a first request type of the first request; delivering the first request to a first working unit according to a first subscription to the first queue component; and calculating and updating a first list container according to the first request. According to the subject application, it is possible to calculate and update lists based on real-time requests in an efficient and accurate manner.

9 Claims, 15 Drawing Sheets

| request Type | Timestamp | Gift ID | Sender ID | Receiver ID |
|---|---|---|---|---|
| Giftrequest | 1648700958 | terry_001 | 729f6d44 | b70947fa |
| ⋮ | ⋮ | | | |

| Leaderboard ID | Streamer ID | Score | Streamer ID | Score | ... |
|---|---|---|---|---|---|
| k30629qt | Yamada | 5000 | Suzuki | 3000 | ... |
| ... | ... | ... | ... | ... | |
| ... | ... | ... | ... | ... | |

| Subscription ID | Worker ID |
|---|---|
| lb-1-subscription | leaderboard-1 Using Gift request |
| lb-3-subscripiton | leaderboard-3 Using View request |
| ... | ... |

DATA HANDLING METHOD, SYSTEM AND COMPUTER PROGRAM

CROSS-REFERENCE TO RELATED APPLICATIONS

This application is based on and claims the benefit of priority from Japanese Patent Application Serial No. 2022-104864 (filed on Jun. 29, 2022), the contents of which are hereby incorporated by reference in its entirety.

TECHNICAL FIELD

This disclosure relates to information and communication technology, and in particular, to a data handling method and system for updating lists based on real-time requests.

BACKGROUND

Some APPs or platforms provide live streaming services for the streamers and viewers to interact with each other in real-time. Moreover, they also hold a variety of campaigns to attract more streamers and viewers to join the live streaming.

In the campaigns, streamers interact with viewers and a leaderboard may be displayed to show their current ranking. By these campaigns, the streamers may attract more viewers to watch his or her performance, and the viewers may enjoy the live streaming and support their favorite streamers.

Since the interaction between streamers and viewers is real-time, the calculation and update of the leaderboards is required to be fast and accurate. For example, Patent Document 1 disclosed a method for updating leaderboard data in a live broadcast platform. The method disclosed in Patent Document 1 does not consider the number of leaderboards running in parallel. In a large-scale live streaming platform, it is common that a few tens or even hundreds of leaderboards are running in parallel. In such a situation, with the prior art, delay of response occurs. Therefore, a more efficient and accurate method suitable for handling real-time data such as leaderboard is on demand.

[Patent Document 1]: CN110401843B

SUMMARY

An embodiment of subject application relates to a data handling method for updating lists based on real-time requests, comprising: transmitting a first request to a first queue component according to a first request type of the first request; delivering the first request to a first working unit according to a first subscription to the first queue component; and calculating and updating a first list container according to the first request.

Another embodiment of subject application relates to a data handling system for updating lists based on real-time requests, comprising: an information processing unit configured to transmit a first request to a first queue component according to a first request type of the first request; and a message delivery unit configured to deliver the first request to a first working unit according to a first subscription to the first queue component; wherein the first working unit is configured to calculate and update a first list container according to the first request.

Another embodiment of subject application relates to a computer program for causing a server to realize the functions of: transmitting a first request to a first queue component according to a first request type of the first request; delivering the first request to a first working unit according to a first subscription to the first queue component; and calculating and updating a first list container according to the first request.

According to the subject application, it is possible to calculate and update lists based on real-time requests in an efficient and accurate manner.

BRIEF DESCRIPTION OF THE DRAWINGS

FIG. 3 shows an exemplary data structure of the request DB 110 in FIG. 2;

FIG. 4 shows an exemplary data structure of the list DB 112 in FIG. 2;

FIG. 5 shows an exemplary data structure of the subscription DB 114 in FIG. 2;

DETAILED DESCRIPTION

Hereinafter, the identical or similar components, members, procedures or signals shown in each drawing are referred to with like numerals in all the drawings, and thereby an overlapping description is appropriately omitted. Additionally, a portion of a member which is not important in the explanation of each drawing is omitted.

The live streaming system 1 according to some embodiments of subject application provides enhancement among the users to communicate and interact smoothly. More specifically, it entertains the viewers and streamers in a technical way.

Figure 16:
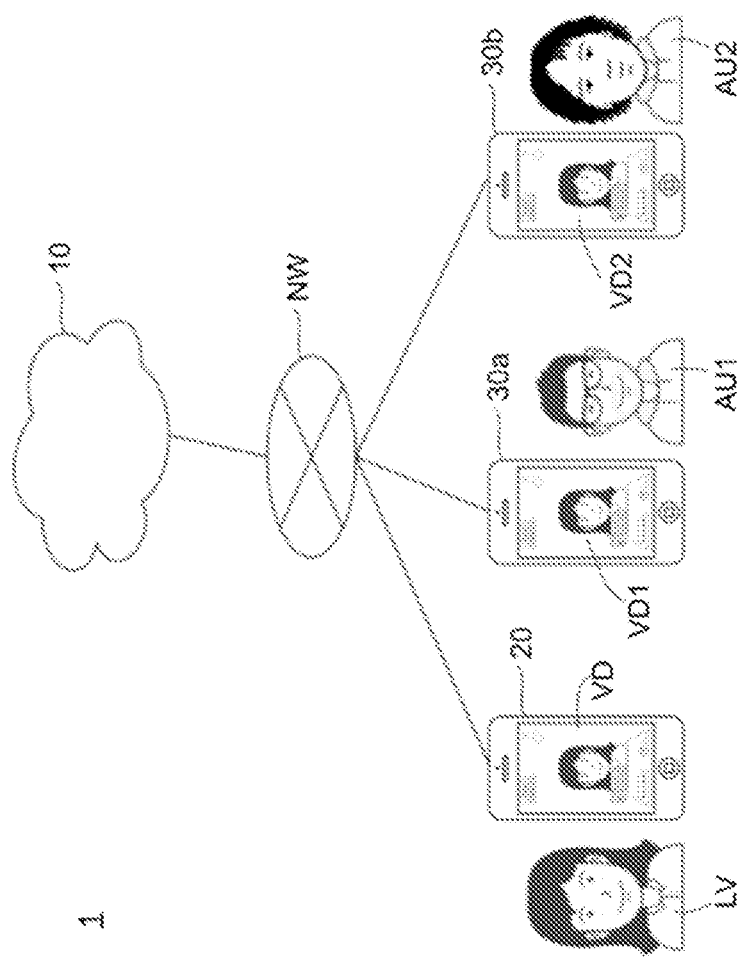
FIG. 16 is a schematic configuration of a live streaming system 1 according to some embodiments of subject application.

FIG. 16 shows a schematic configuration of a live streaming system 1 according to some embodiments of subject application. The live streaming system 1 provides a live streaming service for the streaming distributor (may also be referred as live or streamer) LV and viewer (may also be referred as audience) AU (AU1, AU2 . . . ) to interact mutually in real time.

As shown in FIG. 16, the live streaming system 1 may include a server 10, a user terminal 20 and a user terminal 30 (30a, 30b . . . ). The user terminal 20 may be a streamer and the user terminal 30 may be a viewer. In some embodiments, the streamers and viewers may be referred to as the user. The server 10 may include one or a plurality of information processing devices connected via network NW. The user terminal 20 and 30 may be, for example, a portable terminal such as the smartphone, tablet, laptop PC, recorder, mobile game console, wearable device or the like, or the stationary computer such as desktop PC. The server 10, user terminal 20 and user terminal 30 may be communicably connected by any type of wire or wireless network NW.

The live streaming system 1 is involved in the streamer LV, the viewer AU, and APP provider (not shown), who provides the server 10. The streamer LV may record his/her own contents such as songs, talks, performance, game streaming or the like by his/her own user terminal 20 and upload to the server 10 and be the one who distributes contents in real time. In some embodiments, the streamer LV may interact with the viewer AU via the live streaming.

The APP provider may provide a platform for the contents to go on live streaming in the server 10. In some embodiments, the APP provider may be the media or manager to manage the real time communication between the streamer LV and viewer AU. The viewer AU may access the platform by the user terminal 30 to select and watch the contents he/she would like to watch. The viewer AU may perform operations such as sending gifts, commenting or cheering the streamer by the user terminal 30. The streamer, who provides the contents, may respond to the comment or cheer. The response of the streamer may be transmitted to the viewer AU by video and/or audio or the like. Therefore, a mutual communication among the streamer and viewer may be accomplished.

The "live streaming" in this specification may be referred to as the data transmission which enables the contents the streamer LV recorded by the user terminal 20 to be substantially reproduced and watched by the viewer AU via the user terminal 30, In some embodiments, the "live streaming" may also refer to the streaming which is accomplished by the above data transmission. The live streaming may be accomplished by the well-known live streaming technology such as HTTP Live Streaming, Common Media Application Format, Web Real-Time Communications, Real-Time Messaging Protocol, MPEG DASH or the like. The live streaming may further include the embodiment that the viewer AU may reproduce or watch the contents with specific delay while the streamer is recording the contents. Regarding the magnitude of the delay, it should be at least small enough to enable the streamer LV and the viewer AU to communicate. However, live streaming is different from so-called on-demand streaming. More specifically, the on-demand streaming may be referred to as storing all data, which records the contents, in the server and then providing the data from the server to the user at random timing according to the user's request.

The "streaming data" in this specification may be referred to as the data includes image data or voice data. More specifically, the image data (may be referred to as video data) may be generated by the image pickup feature of the user terminal 20 and 30. The voice data (may be referred to as audio data) may be generated by the audio input feature of the user terminal 20 and 30. The streaming data may be reproduced by the user terminal 20 30, so that the contents relating to users may be available for watching. In some embodiments, during the period from the streaming data being generated by the user terminal of the streamer to being reproduced by the user terminal of the viewer, the processing of changing format, size or specification of the data, such as compression, extension, encoding, decoding, transcoding or the like, is predictable. Before and after this kind of processing, the contents (such as video and audio) is substantially unchanged, so it is described in the current embodiments of the present disclosure that the streaming data before being processed is the same as that after being processed. In other words, if the streaming data is generated by the user terminal of the streamer and reproduced by the user terminal of the viewer via the server 10, the streaming data generated by the user terminal of the streamer, the streaming data passed through the server 10 and the streaming data received and reproduced by the by the user terminal of the viewer are all the same streaming data.

As shown in FIG. 16, the streamer LV is providing the live streaming. The user terminal 20 of the streamer generates the streaming data by recording his/her video and/or audio, and transmits to the server 10 via the network NW. At the same time, the user terminal 20 may display the video VD on the display of the user terminal 20 to check the streaming contents of the streamer LV.

The viewer AU1, AU2 of the user terminal 30a, 30b, who request the platform to provide the live streaming of the streamer, may receive streaming data corresponding to the live streaming via the network NW and reproduce the received streaming data to display the video VD1, VD2 on the display and output the audio from a speaker or the like. The video VD1, VD2 displayed on the user terminal 30a, 30b respectively may be substantially the same as the video VD recorded by the user terminal of the streamer LV, and the audio outputted from the terminal 30a, 30b may also be substantially the same as the audio recorded by the user terminal of the streamer LV.

The recording at the user terminal 20 of the streamer may be simultaneous with the reproducing of the streaming data at the user terminal 30a, 30b of the viewer AU1, AU2. If a viewer AU1 inputs a comment on the contents of the streamer LV into the user terminal 30a, the server 10 will display the comment on the user terminal 20 of the streamer in real time, and display on the user terminal 30a, 30b of the viewer AU1, AU2 respectively. If the streamer LV responds to the comment, the response may be outputted as the text, image, video or audio from the terminal 30a, 30b of the viewer AU1, AU2, so that the communication of the streamer LV and viewer LV may be realized. Therefore, the live streaming system may realize the live streaming of two-way communication.

Furthermore, the APP provider may also hold a variety of campaigns to attract more streamers and viewers to join the live streaming. In the campaigns, the streamers and viewers may interact with each other and a leaderboard may be shown to indicate the current ranking of each streamer or viewer. The streamers and viewers may perform more operations in order to be ranked at the top of the leaderboard to win rewards. The campaign may be a competition among streamers and/or viewers to compare their achievement in the live streaming. For example, the campaign may be a gift campaign. In a gift campaign, the streamers may interact with the viewers to motivate the viewers to donate gifts to the streamers. Each gift may have a corresponding score and the streamer's gift score may be the sum of the score of the gifts the streamer received. In some embodiments, other parameters in a live streaming may also be compared, for example, the snack score, PK score, voting score, streaming time, viewing time, following number, follower number or the like.

Figure 1:
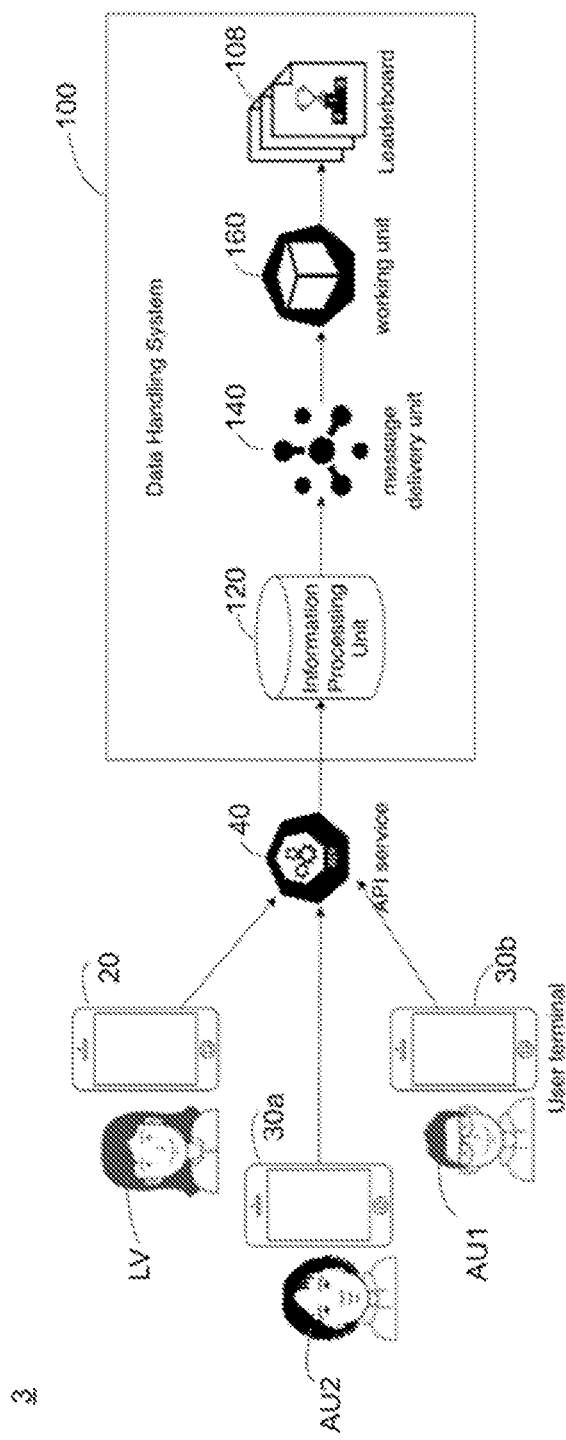
FIG. 1 is a schematic configuration of a communication system 3 according to some embodiment of the disclosure.

FIG. 1 shows a schematic configuration of a communication system 3 according to some embodiments of subject application. The communication system 3 provides a real-time data calculation and update service. As shown in FIG. 1, the communication system 3 may include the user terminal 20, the user terminal 30 (30a, 30b . . . ), an API service 40 and a data handling system 100. In some embodiments, the user terminal 20 may be the streamer LV and the user terminal 30 may be the viewer AU.

The viewer AU may perform an operation by the user terminal 30 such as sending a gift to a streamer LV. In some embodiments, the operation may be transmitted to the data handling system 100 via the API service 40. More specifically, the API service 40 may generate a request and transmit the request to the data handling system 100 in response to the operation from the user terminal 30. In some embodiments, the request may be for calculating and updating a list in the data handling system 100. In some embodiments, the list may be a leaderboard in a campaign showing the ranking of the streamers or viewers in the campaign. For example, if the viewer AU sends a gift to the streamer LV, the API service 40 may generate a request and transmit the request to the data handling system 100. The data handling system 100 may calculate and update a leaderboard in a campaign according to the operation of sending a gift.

In some embodiments, the operation may include an interaction between a streamer and a viewer in a live streaming. For example, the operation may include sending a gift, receiving a gift, sending a snack, receiving a snack, voting for a streamer, viewing a streamer, live broadcasting, following a streamer or the like. In some embodiments, the operation may be determined according to the campaign.

In some embodiments, the user terminal 20, user terminal 30, API service 40 and data handling system 100 may be communicably connected by any type of wire or wireless network NW. The data handling system 100 may include one or a plurality of information processing devices connected via network NW. The communication system 3 is involved in the streamer LV, the viewer AU, and APP provider (not shown), who provides the data handling system 100.

Here, the time from an operation being performed to the update of the leaderboard may be referred to as the "travel time" of a request. If the travel time is long, the time for calculating and updating the leaderboard would get longer and may affect the update for another leaderboard. In order to calculate and update the leaderboards in a fast and accurate manner, the travel time is suggested to be as short as possible.

Figure 2:
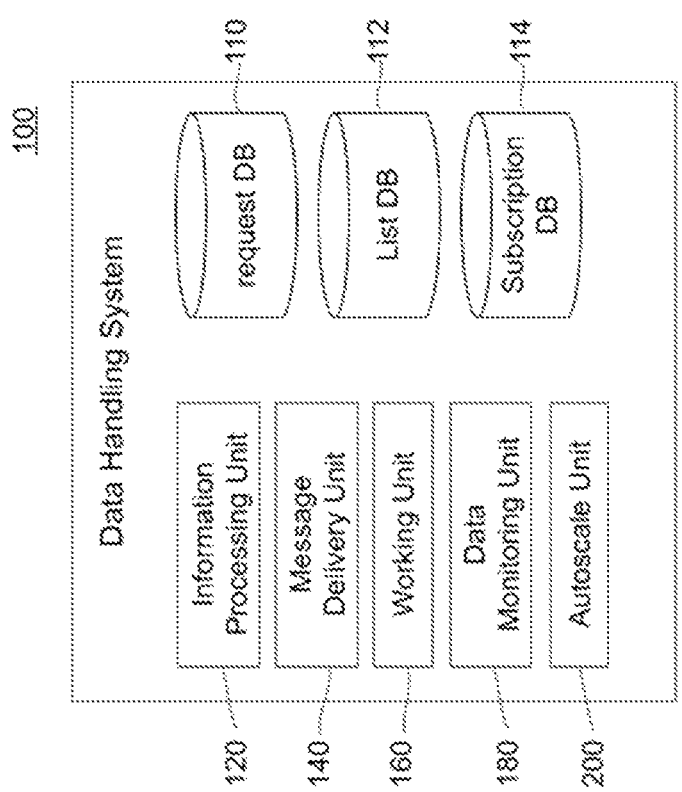
FIG. 2 is a schematic block diagram of the data handling system 100 according to some embodiments of the disclosure.

FIG. 2 is a schematic block diagram of the data handling system 100 in FIG. 1 according to some embodiments of the disclosure. The blocks depicted in the block diagram of this specification are implemented in hardware such as devices like a CPU of a computer or mechanical components, and in software such as a computer program depicts functional blocks implemented by the cooperation of these elements. Therefore, it will be understood by those skilled in the art that the functional blocks may be implemented in a variety of manners by a combination of hardware and software.

As shown in FIG. 2, the data handling system 100 may include the information processing unit 120, message delivery unit 140, working unit 160, request DB 110, list DB 112 and subscription DB 114.

The information processing unit 120 may be configured to transmit a request to a queue component in the message delivery unit 140. More specifically, the information processing unit 120 may obtain a request from the API service 40 and transmit the request to a queue component in the message delivery unit 140. In some embodiments, the information processing unit 120 may transmit the request to a queue component according to a request type of the request. In some embodiments, the information processing unit 120 may store the request in the request DB 110. In some embodiments, the information processing unit 120 may determine the request type according to the request.

In some embodiments, the request type of the request may be determined by the operation of the user terminal or the contents of the campaign. For example, the campaign may be a competition among the streamers to compare the gifts they received or a competition among the viewers to compare the gifts they sent. In this situation, if the viewer performs an operation of sending a gift, the request type of the request may be referred to as a gift request type.

In some embodiments, the campaign may be a competition among the streamers to compare the snacks they received or a competition among the viewers to compare the snacks they sent. In this situation, if the viewer performs an operation of sending a snack, the request type of the request may be referred to as a snack request type. In some embodiments, the gift and snack may be referred to as virtual items the viewers may send to the streamers to support their performance. In some embodiments, the gifts may be the virtual items that the viewer purchased and the snacks may be the virtual items for free.

In some embodiments, the campaign may be a competition among the streamers to compare the viewing time of the viewer or a streaming time of the streamer. In this situation, if the viewer performs an operation of watching a streamer for a period, the request type of the request may be referred to as a view request type.

In some embodiments, the campaign may be a competition to compare the PK score, voting score, streaming time, viewing time, following number, follower number or the like. In this situation, the request type may be corresponding to the operation of the user terminal or the contents of the campaign. In some embodiments, a general request type may also be used to indicate a combination of several request types. For example, the general request type may include the request of updating streaming time, PK score, vote result, following number, follower number or the like.

The message delivery unit 140 may be configured to deliver the request to the working unit 160 according to a subscription to a queue component in the message delivery unit 140. More specifically, the message delivery unit 140 may include one or more queue components. The queue component may receive the request from the information processing unit 120. In some embodiments, the queue component may be corresponding to the request type of the request. For example, the message delivery unit 140 may include gift queue component, snack queue component, view queue component, general queue component or the like. The gift queue component may receive the request with the request type of gift request. In some embodiments, the information processing unit 120 may transmit the request to a corresponding queue component according to the request type.

In some embodiments, the message delivery unit 140 may provide a queuing service to receive and deliver requests in a plurality of queue components to parallelize tasks. In some embodiments, the message delivery unit 140 may, for example, be a publish-subscribe ("pub/sub") service provided by a third party such as Google or the like. In some embodiments, the information processing unit 120 may be the publisher and the working unit 160 may be the subscriber respectively. In some embodiments, the information processing unit 120 may publish a request to the message delivery unit 140 and the working unit 160 may subscribe to the message delivery unit 140. In some embodiments, the publishers communicate with the subscribers in an asynchronous manner rather than in a synchronous manner.

The working unit 160 may be configured to calculate and update a list according to the request. In some embodiments, the working unit 160 may include one or more pod units (not shown) for handling requests for the list container. In some embodiments, the pod unit may be configured to calculate and update one or more list containers. Each list container may include a list for calculation and update. The pod unit may calculate and update the list according to the requests. In some embodiments, the list may be referred to as a leaderboard in a campaign. In some embodiments, the pod unit may calculate and update one or more leaderboards in a campaign.

In some embodiments, a list container may subscribe to a queue component in order to receive the corresponding request. For example, in a leaderboard showing the ranking of the gifts the streamers received, the list container may subscribe to the gift queue component for receiving the gift request and to calculate and update the leaderboard. In some embodiments, the list type of the list may be corresponding to the request type of the request. More specifically, the list type of the list may also include gift list type, snack list type, view list type, general list type or the like.

In some embodiments, the list container may subscribe to a corresponding queue component according to the list type. For example, the list container with the list type of gift list type may subscribe to a gift queue component. In some embodiments, the message delivery unit 140 may deliver the request to the working unit 160 according to a subscription to the queue component. For example, the message delivery unit 140 may deliver a gift request to a list container in the working unit 160 in response to the subscription of the list container to a gift queue component in the message delivery unit 140.

FIG. 3 shows an exemplary data structure of the request DB 110 in FIG. 2. The request DB 110 associatively stores the request data of the request in a campaign. In some embodiments, the request may include request type, timestamp, gift ID, sender ID, receiver ID or the like. The request type identifies the type of the request. In some embodiments, the request type may be the gift request, view request, snack request, general request or the like.

The timestamp identifies the time which the request occurred. In some embodiments, the timestamp may be a sequence of characters or encoded information to show the time such as date, hour, minute, second or the like. The gift ID identifies the gift involved in the request. In some embodiments, the gift ID may indicate the gift the streamer received, the gift the viewer sent or the like. The sender ID identifies the user terminal who sends a gift or snack. The receiver ID identifies the user terminal who receives a gift or snack. In some embodiments, the request ID may include, for example, the viewer ID, streamer ID, viewing time, streaming time, gift score or the like. In some embodiments, the request may include other necessary data in a campaign.

FIG. 4 shows an exemplary data structure of the list DB 112 in FIG. 2. The list DB 112 associatively stores the list data. In some embodiments, the list may be referred to as the leaderboard in a campaign and the list data may be referred to as the leaderboard data. In some embodiments, the leaderboard data may include leaderboard ID, streamer ID, score or the like. The leaderboard ID identifies the leaderboard in a campaign. The streamer ID identifies the streamer involved in the campaign. The score identifies the achievement the participants obtain in the campaign. In some embodiments, the score may be the total value of gift number, gift score, snack number, snack score, PK score, voting result, streaming time, viewing time, following number, follower number or the like.

FIG. 5 shows an exemplary data structure of the subscription DB 114 in FIG. 2. The subscription DB 114 associatively stores the subscription data between the message delivery unit 140 and the working unit 160. In some embodiments, the subscription data may include subscription ID, worker ID or the like. The subscription ID identifies the subscription between a queue component and a list container. The worker ID identifies the list container corresponding to the subscription ID.

Figure 6:
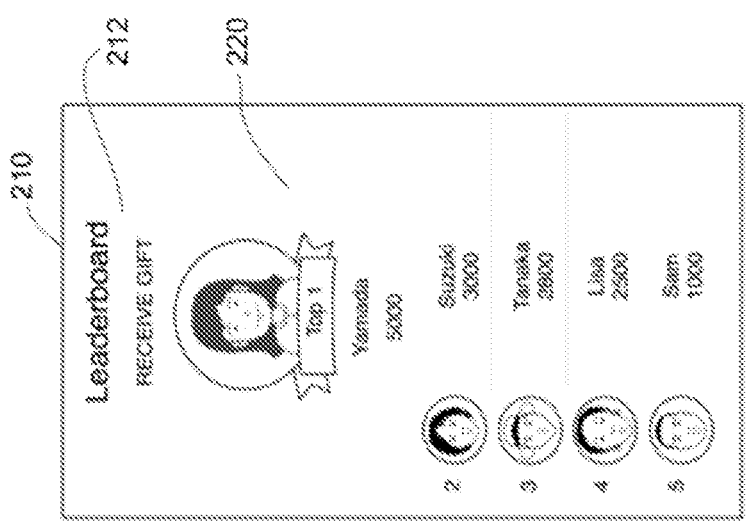
FIG. 6 shows an exemplary screen 210 of the user terminal with the leaderboard.
Figure 7:
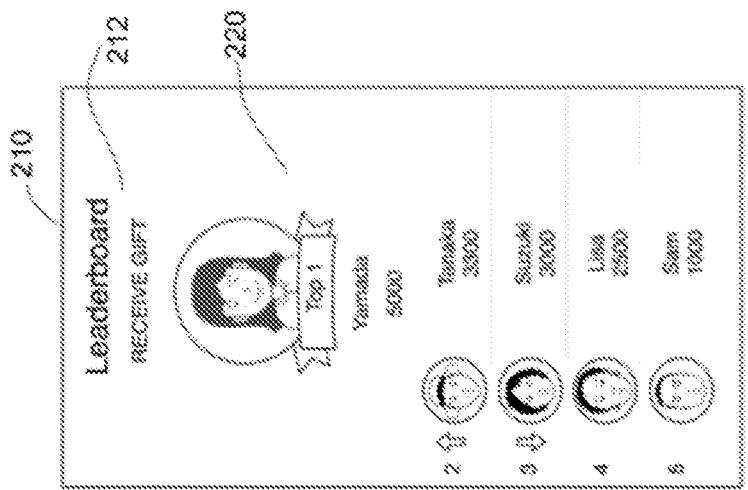
FIG. 7 shows an exemplary screen 210 of the user terminal with the leaderboard.

FIG. 6 and FIG. 7 shows an exemplary screen 210 of a user terminal with the leaderboard. The screen 210 of a user terminal may include an information object 212 and leaderboard zone 220. The information object 212 may show the information of the campaign such as the name of the leaderboard, the contents of the campaign or the like. The leaderboard zone 220 may show the leaderboard in the campaign. More specifically, the working unit 160 may calculate each participant's score and show the result on the screen 210. In some embodiments, the working unit 160 may show the streamer's information and its corresponding score. Therefore, the streamers and viewers may understand the current score and ranking of each participant.

In some embodiments, the working unit 160 may show the streamer's information with its corresponding score and rank them from high to low according to the corresponding score. It may motivate the viewers to interact with the streamers in order to support their favorite streamer. As shown in FIG. 6, the gift score of the streamer Yamada is 5000 in the leaderboard of receiving gifts, and the score of the streamer Suzuki, Tanaka, Lisa and Sam is 3000, 2800, 2500 and 1000 respectively. In some embodiments, a viewer may attend Tanaka's live streaming and donate a gift with the score of 500 points to Tanaka. In some embodiments, the operation of donating the gift may be generated as a gift request and transmitted to the working unit 160 for calculating and updating the leaderboard. In some embodiments, the working unit 160 may calculate the leaderboard according to the gift request. More specifically, the working unit 160 may calculate the score of Tanaka and update the score and ranking in the leaderboard. As shown in FIG. 7, The streamer Tanaka may be ranked second and the streamer Suzuki may be ranked third after the calculation and update is finished.

Figure 8:
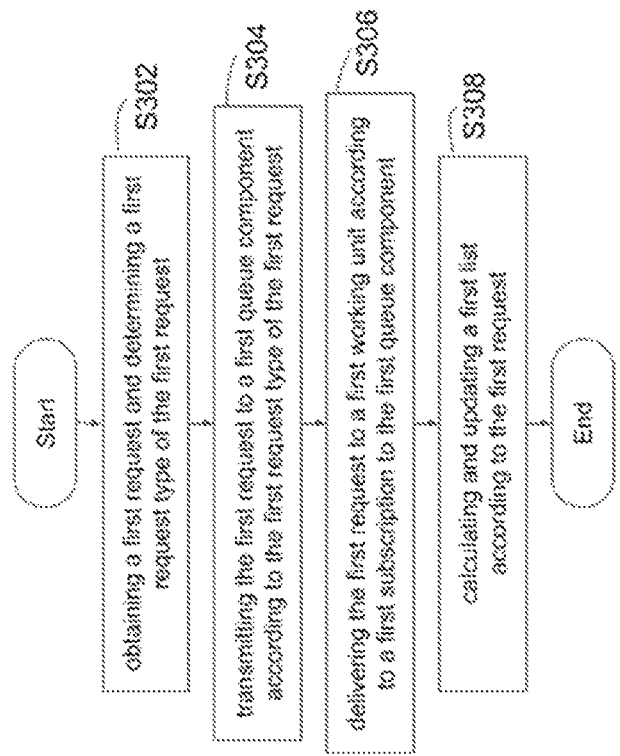
FIG. 8 is an exemplary sequence chart illustrating an operation of the configuration of the data handling system 100 according to some embodiments of subject application.

FIG. 8 is an exemplary sequence chart illustrating an operation of the configuration of the data handling system 100 according to some embodiments of subject application. The information processing unit 120 may obtain a first request and determine a first request type of the first request (S302). Then, the information processing unit 120 may transmit the first request to a first queue component according to the first request type of the first request (S304). The message delivery unit 140 may deliver the first request to a first working unit according to a first subscription to the first queue component (S306). The working unit 160 may calculate and update a first list according to the first request (S308).

Figure 9:
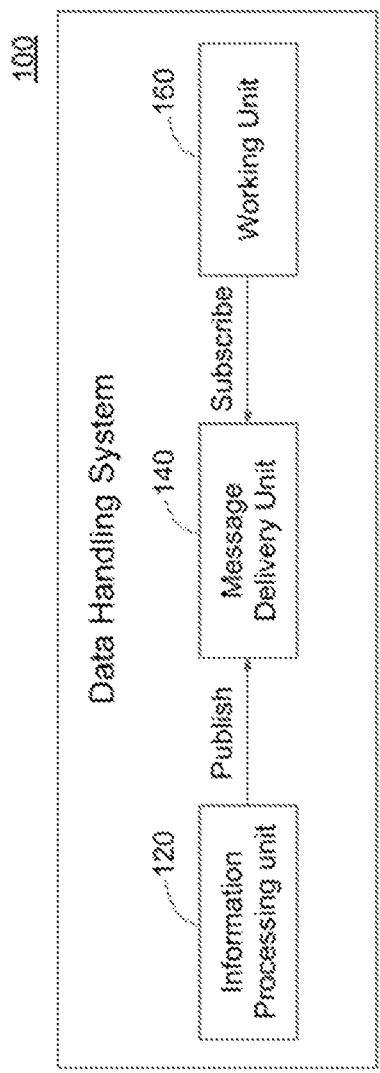
FIG. 9 is a schematic block diagram of the data handling system 100 according to some embodiments of the disclosure.
Figure 10:
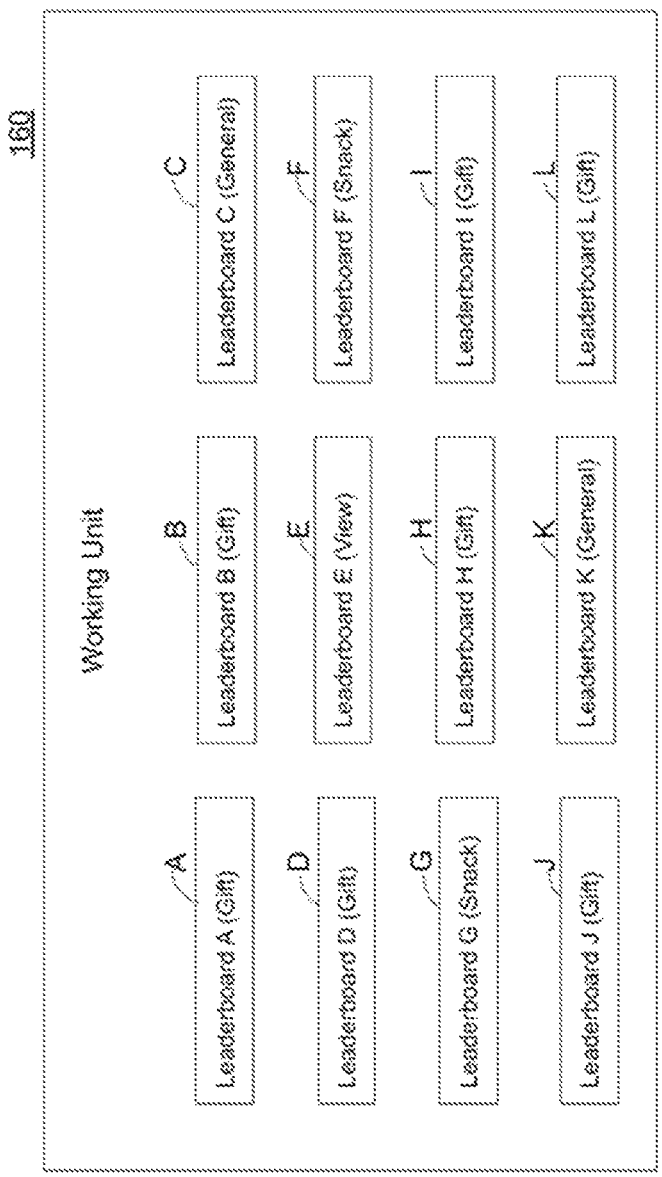
FIG. 10 is a schematic block diagram of the working unit 160 according to some embodiments of the disclosure.
Figure 11:
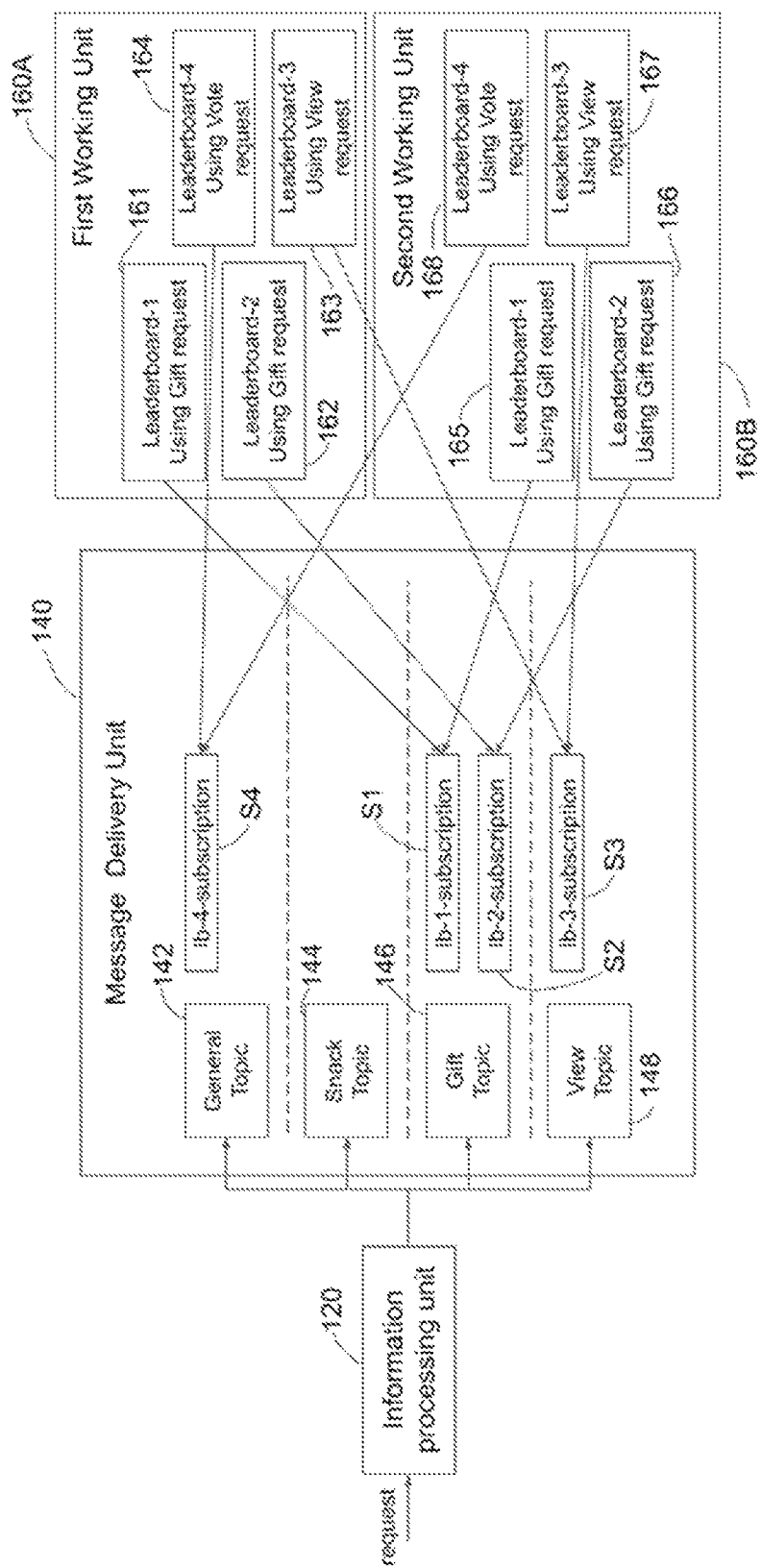
FIG. 11 is an exemplary functional configuration of the data handling system 100 according to some embodiments of the disclosure.

FIG. 9-FIG. 11 shows an embodiment of the data handling system 100 according to some embodiments of the disclosure. FIG. 9 is a schematic block diagram of the data handling system 100 according to some embodiments of the disclosure. FIG. 10 is a schematic block diagram of the working unit 160 according to some embodiments of the disclosure. FIG. 11 is an exemplary functional configuration of the data handling system 100 according to some embodiments of the disclosure.

As shown in FIG. 9, the data handling system 100 may include an information processing unit 120, message delivery unit 140 and working unit 160. The information processing unit 120 may obtain a request and transmit the request to the message delivery unit 140. In some embodiments, the information processing unit 120 may publish the request to a corresponding queue component in the message delivery unit 140. The working unit 160 may subscribe to a queue component in the message delivery unit 140. Once a queue component in the message delivery unit 140 receives a request, the message delivery unit 140 may transmit the request to the working unit 160. The working unit 160 may calculate and update the corresponding leaderboard according to the request.

As shown in FIG. 10, the working unit 160 may include a plurality of list containers A-L with a plurality of lists. In some embodiments, each list container may include a leaderboard showing a ranking in a campaign. The list container A-L may be classified according to the list type of the list. In some embodiments, the list type of the list may be corresponding to the request type of the request. For example, the list containers A, B, D, H, I, J and L may be the leaderboards relating to the list type of gift list. The list containers C and K may be the leaderboards relating to the list type of general list. The list container E may be the leaderboard relating to the list type of view list. The list containers F and G may be the leaderboards relating to the list type of snack list.

In some embodiments, one list container may include one leaderboard relating to one request type. In some embodiments, one list container may include more than one leaderboard relating to one request type. In some embodiments, one list container may include one leaderboard relating to more than one request type. In some embodiments, one list container may include more than one leaderboard relating to more than one request type. In some embodiments, the list container may be configured according to the practical need.

As shown in FIG. 11, the information processing unit 120 may obtain a request. In some embodiments, the information processing unit 120 may publish the request to a queue component according to the request type of the request. The message delivery unit 140 may include one or more queue components. In some embodiments, the queue components may be classified according to the request type of the request. In some embodiments, the message delivery unit 140 may include general queue component 142, snack queue component 144, gift queue component 146 and view queue component 148. In some embodiments, the queue component may be corresponding to the request type of the request. In some embodiments, the queue component may be a topic in a pub/sub service. In some embodiments, the number of queue components or the topic of the queue components may be determined according to the practical need.

In some embodiments, the data handling system 100 may include one or more working unit 160. In some embodiments, the data handling system 100 may include a first working unit 160A and second working unit 160B. In some embodiments, each working unit may include one or more list containers with leaderboards. In some embodiments, one working unit may include different leaderboards from the other working unit, or one leaderboard may be included by one or more different working units. In other words, one working unit may handle one leaderboard by itself, or handle one leaderboard together with another working unit.

In some embodiments, the first working unit 160A and second working unit 160B may include one or more leaderboards respectively. In some embodiments, the first working unit 160A may include list container 161, list container 162, list container 163 and list container 164. In some embodiments, the second working unit 160B may include list container 165, list container 166, list container 167 and list container 168. In some embodiments, the first working unit 160A may include the same or partially the same list containers as the second working unit 160B, or the first working unit 160A may include different list containers from the second working unit 160B.

In some embodiments, the list container 161 may be the leaderboard using the gift request for calculation and update. In some embodiments, the list container 162 may be the leaderboard using the gift request for calculation and update. In some embodiments, the list container 163 may be the leaderboard using the view request for calculation and update. In some embodiments, the list container 164 may be the leaderboard using the vote request for calculation and update.

In some embodiments, the list container 165 may be the leaderboard using the gift request for calculation and update. In some embodiments, the list container 166 may be the leaderboard using the gift request for calculation and update. In some embodiments, the list container 167 may be the leaderboard using the view request for calculation and update. In some embodiments, the list container 168 may be the leaderboard using the vote request for calculation and update.

In some embodiments, the list container 161 may include the leaderboard using gift requests for calculation and update. Therefore, the list container 161 may subscribe to the gift queue component 146. In some embodiments, the list container 162 may subscribe to the gift queue component 146. In some embodiments, the list container 163 may subscribe to the view queue component 148. In some embodiments, the list container 164 may subscribe to the general queue component 142. Similarly, the list containers 165, 166, 167 and 168 may subscribe to the corresponding queue component respectively.

The information processing unit 120 may receive a request. The information processing unit 120 may determine which queue component the request should be directed to according to the request type. If the request type of the request is a gift request, the information processing unit 120 may publish the request to the gift queue component 146. Once a gift request is published to the gift queue component 146, the message delivery unit 140 may deliver the gift request to the list container 161 and/or 165 according to a subscription S1 to the gift queue component 146. In some embodiments, the message delivery unit 140 may deliver the gift request to the list container 162 and/or 166 according to a subscription S2 to the gift queue component 146. In some embodiments, the message delivery unit 140 may deliver the view request to the list container 163 and/or 167 according to a subscription S3 to the gift queue component 148. In some embodiments, the message delivery unit 140 may deliver the vote request to the list container 164 and/or 168 according to a subscription S4 to the general queue component 142. In some embodiments, the first working unit 160A and second working unit 160B may calculate the leaderboard in the list container 161-168 respectively and update the leaderboard to show the current ranking in a campaign.

In this embodiment, each working unit 160 is responsible for one or more list containers. Therefore, the system may be constructed with lower cost and effort. In addition, an additional working unit may be introduced and implemented easily to lower the workload for each working unit 160.

Figure 12:
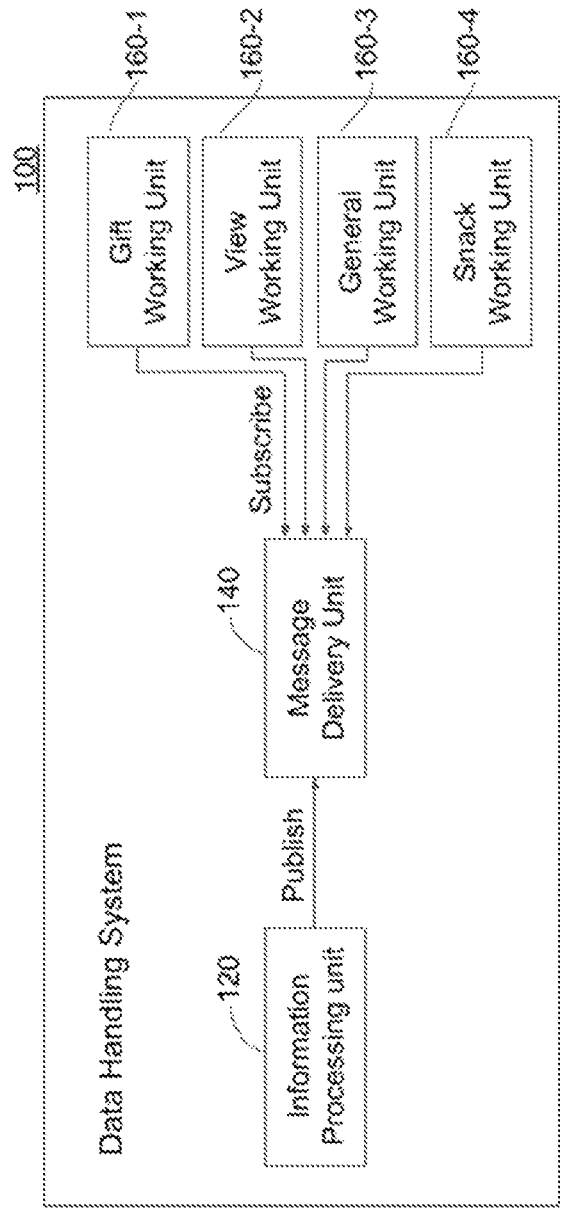
FIG. 12 is a schematic block diagram of the data handling system 100 according to some embodiments of the disclosure.
Figure 13:
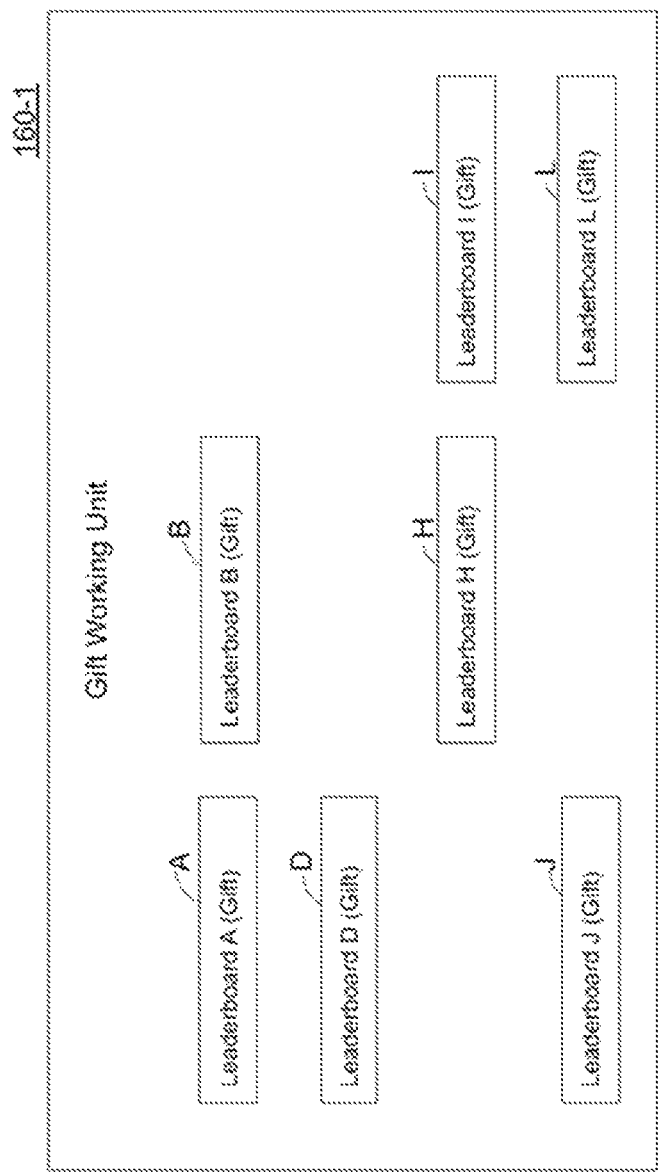
FIG. 13 is a schematic block diagram of the working unit 160 according to some embodiments of the disclosure.
Figure 14:
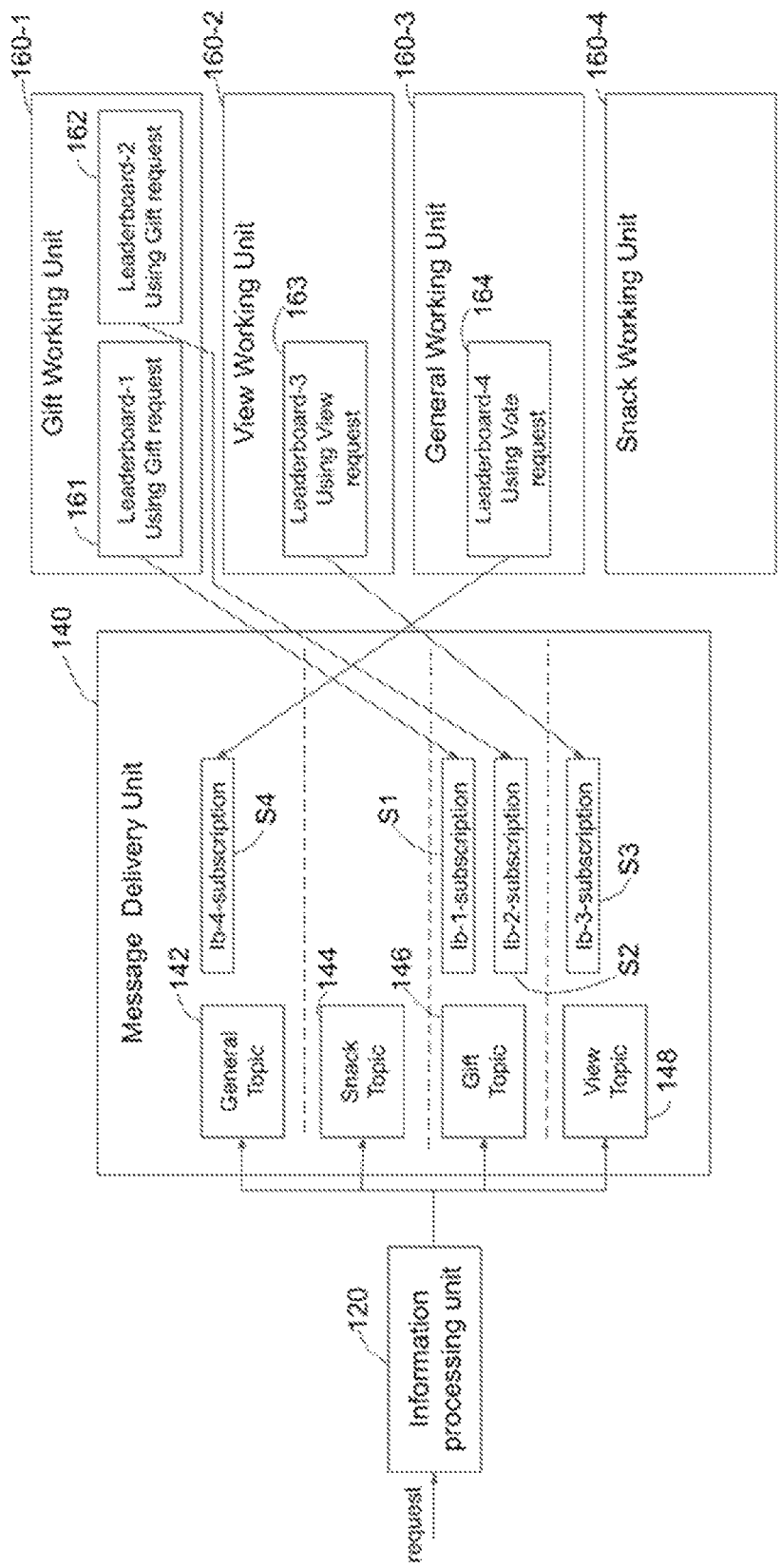
FIG. 14 is an exemplary functional configuration of the data handling system 100 according to some embodiments of the disclosure.

FIG. 12-FIG. 14 shows an embodiment of the data handling system 100 according to some embodiments of the disclosure. FIG. 12 is a schematic block diagram of the data handling system 100 according to some embodiments of the disclosure. FIG. 13 is a schematic block diagram of the working unit 160 according to some embodiments of the disclosure. FIG. 14 is an exemplary functional configuration of the data handling system 100 according to some embodiments of the disclosure.

As shown in FIG. 12, the data handling system 100 may include an information processing unit 120, message delivery unit 140 and one or more working units 160. In some embodiments, the working unit 160 may include gift working unit 160-1, view working unit 160-2, general working unit 160-3 and working unit 160-4. In some embodiments, the working units 160-1, 160-2, 160-3 and 160-4 are classified according to the request type of the request or the list type of the list. For example, the gift working unit 160-1 may include the list container with the list type of gift list. The list container may subscribe to the gift queue component for receiving gift requests. The view working unit 160-2 may include the list container with the list type of view list. The list container may subscribe to the view queue component for receiving view requests. The general working unit 160-3 may include the list container with the list type of general list. The list container may subscribe to the general queue component for receiving general requests. The snack working unit 160-4 may include the list container with the list type of snack list. The list container may subscribe to the snack queue component for receiving snack requests.

The information processing unit 120 may obtain a request and publish the request to a corresponding queue component in the message delivery unit 140. The working unit 160 may subscribe to a queue component in the message delivery unit 140. Once a queue component in the message delivery unit 140 receives a request, the message delivery unit 140 may transmit the request to the corresponding working unit 160-1, 160-2, 160-3 and 160-4 respectively. The working unit 160-1, 160-2, 160-3 and 160-4 may calculate and update the corresponding leaderboard according to the request.

As shown in FIG. 13, the gift working unit 160-1 may include list containers A, B, D, H, I, J and L. In some embodiments, each list container may include a leaderboard showing a ranking in a campaign. The list container A, B, D, H, I, J and L may be classified according to the list type of the list. In some embodiments, the list type of the list may be corresponding to the request type of the request. For example, the list containers A, B, D, H, I, J and L may be the leaderboards relating to the list type of gift list. In some embodiments, the gift working unit 160-1 may only include the list container with the leaderboard relating to the list type of gift list. In some embodiments, the view working unit 160-2 may only include the list container with the leaderboard relating to the list type of view list. In some embodiments, the general working unit 160-3 may only include the list container with the leaderboard relating to the list type of general list. In some embodiments, the snack working unit 160-4 may only include the list container with the leaderboard relating to the list type of snack list.

As shown in FIG. 14, the information processing unit 120 may obtain a request. In some embodiments, the information processing unit 120 may publish the request to a queue component according to the request type of the request. The message delivery unit 140 may include one or more queue components. In some embodiments, the message delivery unit 140 may include general queue component 142, snack queue component 144, gift queue component 146 and view queue component 148. In some embodiments, the queue component may be corresponding to the request type of the request. In some embodiments, the queue component may be a topic in a pub/sub service. In some embodiments, the number of queue components or the topic of the queue components may be determined according to the practical need.

In some embodiments, the gift working unit 160-1 may include list container 161 and list container 162. In some embodiments, the view working unit 160-2 may include list container 163. In some embodiments, the view working unit 160-3 may include list container 164. In some embodiments, one working unit may include a list container different from the other working unit. In some embodiments, one working unit may include the list container corresponding to the same request type. For example, the gift working unit 160-1 may include the list container with leaderboards relating to the request type of gift request. The view working unit 160-2 may include the list container with leaderboards relating to the request type of view request. The general working unit 160-3 may include the list container with leaderboards relating to the request type of general request. The gift working unit 160-4 may include the list container with leaderboards relating to the request type of snack request.

In some embodiments, the list container 161 may be the leaderboard using the gift request for calculation and update. In some embodiments, the list container 162 may be the leaderboard using the gift request for calculation and update. In some embodiments, the list container 163 may be the leaderboard using the view request for calculation and update. In some embodiments, the list container 164 may be the leaderboard using the vote request for calculation and update.

In some embodiments, the list container 161 may subscribe to the gift queue component 146. In some embodiments, the list container 162 may subscribe to the gift queue component 146. In some embodiments, the list container 163 may subscribe to the view queue component 148. In some embodiments, the list container 164 may subscribe to the general queue component 142.

As shown in FIG. 14, the information processing unit 120 may receive a request. The information processing unit 120 may determine which queue component the request should be directed to according to the request type. If the request type of the request is a gift request, the information processing unit 120 may publish the request to the gift queue component 146. Since the list container 161 and 162 use gift requests for calculation and update, the list container 161 and list container 162 may subscribe to the gift queue component 146. Once a gift request is published to the gift queue component 146, the message delivery unit 140 may deliver the gift request to the list container 161 according to a subscription S1 to the gift queue component 146. In some embodiments, the message delivery unit 140 may deliver the gift request to the list container 162 according to a subscription S2 to the gift queue component 146. In some embodiments, the message delivery unit 140 may deliver a view request to the list container 163 according to a subscription S3 to the gift queue component 148. In some embodiments, the message delivery unit 140 may deliver the general request to the list container 164 according to a subscription S4 to the general queue component 142. In some embodiments, the gift working unit 160-1, the view working unit 160-2 and the general working unit 160-3 may calculate the leaderboard in the list container 161-164 respectively and update the leaderboard to show the current ranking in a campaign.

Because of the asynchronous nature of the queuing service like Google Pub/Sub, in the prior art system, many collisions of messages occur at a subscriber/pod unit side, which causes delay of response. In this disclosure, each subscriber/working unit/pod unit is dedicated to a respective type of leaderboard. Therefore, the collisions of requests between different types of leaderboard are suppressed or eliminated, which alleviates the delay of response.

In some embodiments, the working unit 160 may include one or more pod units for handling the requests. The more requests one pod unit is handling per second, the maximum travel time for the requests would get longer and longer. However, if the maximum travel time becomes longer and longer, the accuracy of the leaderboard may be affected. Therefore, an acceptable maximum travel time may be determined to ensure the accuracy of the leaderboard.

If a maximum travel time is determined, the number of requests one pod unit is capable of handling per second may be determined. Moreover, the number of pod units for the working unit 160 may be determined according to the number of requests received by the working unit 160 per second and the number of requests one pod unit is capable of handling per second. In some embodiments, the maximum travel time may be around 10 seconds. Therefore, the data handling system 100 may adjust the number of pod units for each working unit 160 dynamically based on an acceptable maximum travel time.

Referring to FIG. 2, the data handling system 100 may further include a data monitoring unit 180 and autoscale unit 200. The data monitoring unit 180 may be configured to monitor the number of requests each queue component received per second. The autoscale unit 200 may be configured to adjust the number of pod units in each working unit 160 dynamically according to the number of requests each queue component received per second. In some embodiments, the data monitoring unit 180 may be a service provided by a third party such as Cloud monitoring provided by GCP or the like.

The autoscale unit 200 may determine the number of pod units in the working unit 160 according to the number of requests the queue component receives per second and the number of requests the pod unit is capable of handling. More specifically, if the working unit 160 includes one pod unit handling one list container, the number of requests the pod unit is capable of handling may be determined by testing. Accordingly, the number of pod units in one working unit 160 may be determined according to the number of requests the queue component received per second, the number of list containers and the number of requests the pod unit is capable of handling.

In some embodiments, the number of requests the queue component received may fluctuate time by time. For example, a queue component may suddenly receive a lot of requests during the peak time such as right before the end of a campaign. In some embodiments, the autoscale unit 200 may increase the number of pod units in the working unit 160 if the number of requests the queue component received is over a range. In some embodiments, the autoscale unit 200 may decrease the number of pod units in the working unit 160 if the number of requests the queue component received return to the range.

In some embodiments, the autoscale unit 200 may decrease the number of pod units in the working unit 160 if the number of requests the queue component received is lower than a range. In some embodiments, the autoscale unit 200 may increase the number of pod units in the working unit 160 if the number of requests the queue component received return to the range.

In some embodiments, the autoscale unit 200 may increase the number of pod units in the working unit 160 in a time range TRi. In some embodiments, the autoscale unit 200 may decrease the number of pod units in the working unit 160 in a time range TRd. In some embodiments, the time range TRi may be shorter than the time range TRd. In some embodiments, the time range TRi may be around or less than five minutes. Therefore, if the data handling system 100 receives a lot of requests suddenly, the autoscale unit 200 may increase the number of pod units in the working unit 160 immediately in order to handle the requests in time. In some embodiments, the time range TRi may be around or more than thirty minutes. If the number of pod units in the working unit 160 changes too frequently, the data handling system 100 may become unstable. Therefore, the autoscale unit 200 may decrease the number of pod units gradually to prevent the data handling system 100 from being unstable. In addition, since it is possible to optimize the number of pod units for each type of leaderboard, the total number of pod units is reduced or minimized, which leads to reduction of operating cost of pod units.

According to some embodiments, the result of the leaderboards becomes more accurate or at least maintains its accuracy while suppressing the delay in response, and therefore complaints from the users are reduced and the user satisfaction increases.

Figure 15:
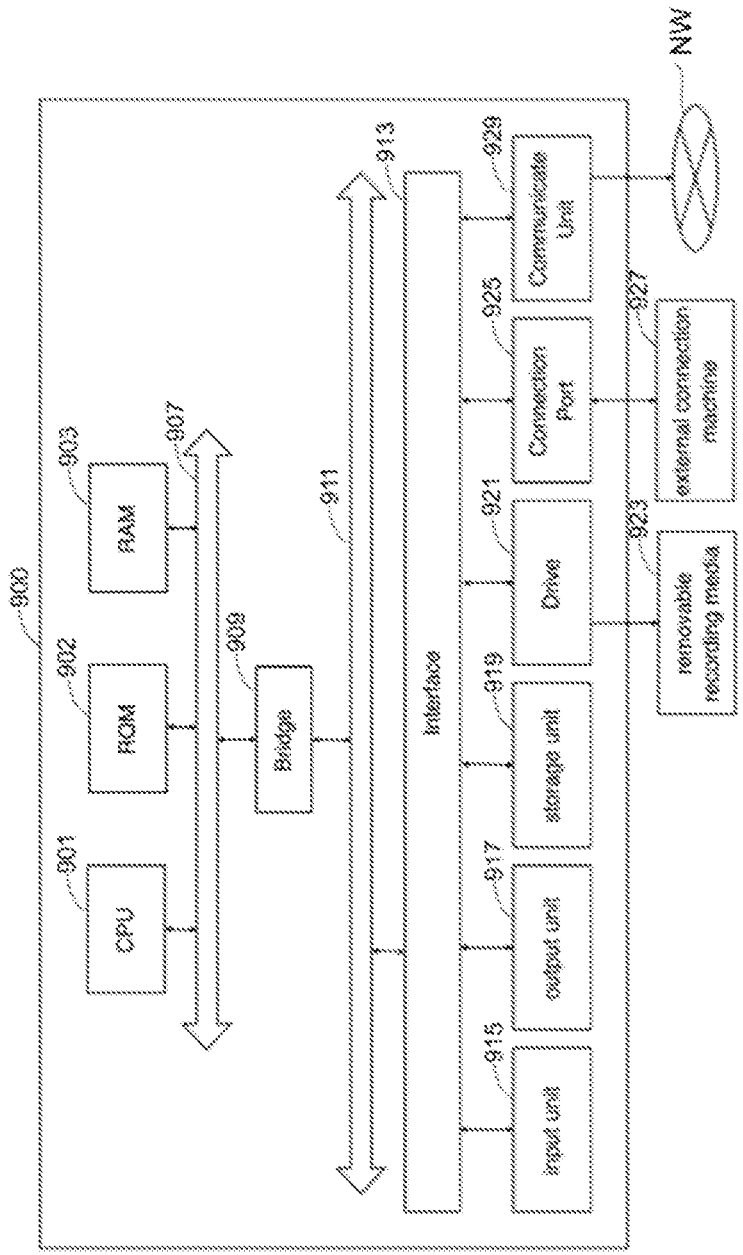
FIG. 15 is a schematic block diagram of computer hardware for carrying out a system configuration and processing according to some embodiments of subject application.

FIG. 15 is a schematic block diagram of computer hardware for carrying out a system configuration and processing according to some embodiments of subject application. The information processing device 900 in FIG. 15 is, for example, is configured to realize the server 10 and the user terminal 20, 30 and the data handling system 100 respectively according to some embodiments of subject application.

The information processing device 900 includes a CPU 901, read only memory (ROM) 903, and random access memory (RAM) 905. In addition, the information processing device 900 may include a host bus 907, a bridge 909, an external bus 911, an interface 913, an input unit 915, an output unit 917, a storage unit 919, a drive 921, a connection port 925, and a communication unit 929. The information processing device 900 may include imaging devices (not shown) such as cameras or the like. The information processing device 900 may include a processing circuit such as a digital signal processor (DSP) or an application-specific integrated circuit (ASIC), instead of or in addition to the CPU 901.

The CPU 901 functions as an arithmetic processing device and a control device, and controls the overall operation or a part of the operation of the information processing device 900 according to various programs recorded in the ROM 903, the RAM 905, the storage unit 919, or a removable recording medium 923. For example, the CPU 901 controls overall operations of respective function units included in the server 10 and the user terminal 20 and 30 of the above-described embodiment. The ROM 903 stores programs, operation parameters, and the like used by the CPU 901. The RAM 905 transiently stores programs used when the CPU 901 is executed, and parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input unit 915 is a device operated by a user such as a mouse, a keyboard, a touchscreen, a button, a switch, and a lever. The input unit 915 may be a device that converts physical quantity to electrical signal such as audio sensor (such as microphone or the like), acceleration sensor, tilt sensor, infrared radiation sensor, depth sensor, temperature sensor, humidity sensor or the like. The input unit 915 may be a remote control device that uses, for example, infrared radiation and another type of radio waves. Alternatively, the input unit 915 may be an external connection device 927 such as a mobile phone that corresponds to an operation of the information processing device 900. The input unit 915 includes an input control circuit that generates input signals on the basis of information which is input by a user to output the generated input signals to the CPU 901. The user inputs various types of data and indicates a processing operation to the information processing device 900 by operating the input unit 915.

The output unit 917 includes a device that can visually or audibly report acquired information to a user. The output unit 917 may be, for example, a display device such as an LCD, a PDP, and an OLED, an audio output device such as a speaker and a headphone, and a printer. The output unit 917 outputs a result obtained through a process performed by the information processing device 900, in the form of text or video such as an image, or sounds such as audio sounds.

The storage unit 919 is a device for data storage that is an example of a storage unit of the information processing device 900. The storage unit 919 includes, for example, a magnetic storage device such as a hard disk drive (HDD), a semiconductor storage device, an optical storage device, or a magneto-optical storage device. The storage unit 919 stores therein the programs and various data executed by the CPU 901, and various data acquired from an outside.

The drive 921 is a reader/writer for the removable recording medium 923 such as a magnetic disk, an optical disc, a magneto-optical disk, and a semiconductor memory, and built in or externally attached to the information processing device 900. The drive 921 reads out information recorded on the mounted removable recording medium 923, and outputs the information to the RAM 905. The drive 921 writes the record into the mounted removable recording medium 923.

The connection port 925 is a port used to directly connect devices to the information processing device 900. The connection port 925 may be a Universal Serial Bus (USB) port, an IEEE1394 port, or a Small Computer System Interface (SCSI) port, for example. The connection port 925 may also be an RS-232C port, an optical audio terminal, a High-Definition Multimedia Interface (HDMI (registered trademark)) port, and so on. The connection of the external connection device 927 to the connection port 925 makes it possible to exchange various kinds of data between the information processing device 900 and the external connection device 927.

The communication unit 929 is a communication interface including, for example, a communication device for connection to a communication network NW. The communication unit 929 may be, for example, a wired or wireless local area network (LAN), Bluetooth (registered trademark), or a communication card for a wireless USB (WUSB).

The communication unit 929 may also be, for example, a router for optical communication, a router for asymmetric digital subscriber line (ADSL), or a modem for various types of communication. For example, the communication unit 929 transmits and receives signals on the Internet or transmits signals to and receives signals from another communication device by using a predetermined protocol such as TCP/IP. The communication network NW to which the communication unit 929 connects is a network established through wired or wireless connection. The communication network NW is, for example, the Internet, a home LAN, infrared communication, radio wave communication, or satellite communication.

The imaging device (not shown) is a device that images real space using an imaging device such as a charge coupled device (CCD) or a complementary metal oxide semiconductor (CMOS), for example, and various members such as a lens for controlling image formation of a subject image on the imaging device and generates a captured image. The imaging device may capture a still picture or may capture a movie.

The present disclosure of the live streaming system 1, communication system 3 and data handling system 100 has been described with reference to embodiments. The above-described embodiments have been described merely for illustrative purposes. Rather, it can be readily conceived by those skilled in the art that various modifications may be made in making various combinations of the above-described components or processes of the embodiments, which are also encompassed in the technical scope of the present disclosure.

The procedures described herein, particularly flowchart or those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present disclosure unless diverged from the purport of the present disclosure.

In some embodiments, at least a part of the functions performed by the server 10 or data handling system 100 may be performed by other than the server 10 data handling system 100, for example, being performed by the user terminal 20 or 30. In some embodiments, at least a part of the functions performed by the user terminal 20 or 30 may be performed by other than the user terminal 20 or 30, for example, being performed by the server 10 or data handling system 100. In some embodiments, the rendering of the frame image may be performed by the user terminal of the viewer, the server, the user terminal of the streamer or the like.

Furthermore, the system and method described in the above embodiments may be provided with a computer-readable non-transitory storage device such as a solid-state memory device, an optical disk storage device, or a magnetic disk storage device, or a computer program product or the like. Alternatively, the programs may be downloaded from a server via the Internet.

Although technical content and features of the present invention are described above, a person having common knowledge in the technical field of the present invention may still make many variations and modifications without disobeying the teaching and disclosure of the present invention. Therefore, the scope of the present invention is not limited to the embodiments that are already disclosed but includes another variation and modification that do not disobey the present invention, and is the scope covered by the following patent application scope.

LIST OF REFERENCE NUMBERS

| | | | |
|---|---|---|---|
| 1 | live streaming system | 3 | communication system |
| 10 | Server | 20 | User terminal |
| 30, 30a, 30b | User terminal | 40 | API service |
| 100 | Data handling system | 110 | Request DB |
| 112 | List DB | 114 | Subscription DB |
| 120 | information processing unit | 140 | message delivery unit |
| 142 | general queue component | 144 | snack queue component |
| 146 | gift queue component | 148 | view queue component |
| 180 | data monitoring unit | 200 | autoscale unit |
| 210 | screen | 212 | information object |
| 220 | leaderboard zone | A-L, 161-168 | list containers |
| AU1, AU2 | Viewer | LV | Streamer |
| 900 | Information processing device | 901 | CPU |
| 903 | ROM | 905 | RAM |
| 907 | Host bus | 909 | Bridge |
| 911 | External bus | 913 | Interface |
| 915 | Input unit | 917 | Output unit |
| 919 | Storage unit | 921 | Drive |
| 923 | Removable recording medium | 925 | Connection port |
| 927 | External connection device | 929 | Communication unit |
| 160, 160-1~160-4, 160A, 160B | working unit | | |
| S302, S304, S306, S308 | Step | | |
| VD, VD1, VD2 | Video | | |

What is claimed is:

1. A data handling method for updating lists based on real-time requests, comprising:
   transmitting a first request to a first queue component according to a first request type of the first request, wherein the first queue component is a topic of a publish-subscribe service, and the first request is published to the first queue component;
   delivering the first request to a first working unit for a first list container that subscribed the first queue component in order to receive the first request; and
   calculating and updating the first list container according to the first request, wherein the first working unit includes one or more pod units for handling the first request, and each pod unit is configured to calculate and update one or more list containers.

2. The data handling method according to claim 1, wherein:
   the first request is based on an operation from a user terminal of a user; and
   the operation includes an interaction between a streamer and a viewer in a live streaming.

3. The data handling method according to claim 1, wherein:
   the first list container includes a leaderboard showing a ranking in a campaign.

4. The data handling method according to claim 1, further comprising:
   transmitting a second request to a second queue component according to a second request type of the second request; wherein
   the first queue component and the second queue component are classified according to the request type of the request.

5. The data handling method according to claim 4, further comprising:
   delivering the second request to a second working unit according to a second subscription to the second queue component; and
   calculating and updating a second list container according to the second request; wherein
   the first working unit and the second working unit is classified according to the list type of the list.

6. The data handling method according to claim 1, further comprising:
   adjusting a number of pod units in the first working unit dynamically according to a number of requests the first queue component received per second.

7. The data handling method according to claim 6, further comprising:
   increasing the number of pod units in the first working unit in a first time range;
   decreasing the number of pod units in the first working unit in a second time range; wherein
   the first time range is shorter than the second time range.

8. A data handling system for updating lists based on real-time requests, comprising:
   a publisher to a publish-subscribe service configured to transmit a first request to a first queue component according to a first request type of the first request, wherein the first queue component is a topic of the publish-subscribe service, and the first request is published to the first queue component; and
   a unit of providing the publish-subscribe service configured to deliver the first request to a subscriber to the publish-subscribe service for a first list container that subscribed the first queue component in order to receive the first request; wherein
   the subscriber to the publish-subscribe service is configured to calculate and update the first list container according to the first request, wherein the subscriber to the publish-subscribe service includes one or more pod units for handling the first request, and each pod unit is configured to calculate and update one or more list containers.

9. A computer-readable non-transitory storage device including program instructions, wherein when the program instructions are executed by one or more processors cause the one or more processors to execute:
   transmitting a first request to a first queue component according to a first request type of the first request, wherein the first queue component is a topic of a publish-subscribe service and the first request is published to the first queue component;

delivering the first request to a first working unit for a first list container that subscribed the first queue component in order to receive the first request; and calculating and updating the first list container according to the first request, wherein the first working unit includes one or more pod units for handling the first request, and each pod unit is configured to calculate and update one or more list containers.

\* \* \* \* \*